(12) United States Patent
Bian

(10) Patent No.: US 11,808,996 B1
(45) Date of Patent: Nov. 7, 2023

(54) WAVEGUIDES AND EDGE COUPLERS WITH MULTIPLE-THICKNESS WAVEGUIDE CORES

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 11 days.

(21) Appl. No.: 17/729,244

(22) Filed: Apr. 26, 2022

(51) Int. Cl.
 *G02B 6/42* (2006.01)

(52) U.S. Cl.
 CPC ............. *G02B 6/4206* (2013.01); *G02B 6/42* (2013.01)

(58) Field of Classification Search
 CPC ................................ G02B 6/42; G02B 6/4206
 See application file for complete search history.

(56) References Cited

U.S. PATENT DOCUMENTS

| | | | |
|---|---|---|---|
| 10,816,726 B1 | 10/2020 | Peng et al. | |
| 2008/0298740 A1* | 12/2008 | Hlousek | G01N 21/7743 385/12 |
| 2021/0278611 A1 | 9/2021 | Sahin et al. | |

OTHER PUBLICATIONS

Houssein El Dirani et al., "Ultralow-loss tightly confining Si3N4 waveguides and high-Q microresonators," Opt. Express 27, 30726-30740 (2019).

Nambiar, S., Ranganath, P., Kallega, R. et al. "High efficiency DBR assisted grating chirp generators for silicon nitride fiber-chip coupling," Sci Rep 9, 18821. https://doi.org/10.1038/s41598-019-55140-8 (2019).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

Y. Bian et al., "Monolithically integrated silicon nitride platform," 2021 Optical Fiber Communications Conference and Exhibition (OFC), pp. 1-3 (2021).

Vladimir Stojanović et al., "Monolithic silicon-photonic platforms in state-of-the-art CMOS SOI processes [Invited]," Optics Express 26, 13106-13121 (2018).

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

(Continued)

*Primary Examiner* — Michael P Mooney

(74) *Attorney, Agent, or Firm* — Thompson Hine LLP; Anthony Canale

(57) ABSTRACT

Photonics structures for a waveguide or an edge coupler and methods of fabricating a photonics structure for a waveguide or an edge coupler. The photonics structure includes a waveguide core having a first section, a second section longitudinally adjacent to the first section, first segments projecting in a vertical direction from the first section, and second segments projecting in the vertical direction from the second section. The first section of the waveguide core has a first thickness, and the second section of the waveguide core has a second thickness that is greater than the first thickness.

20 Claims, 4 Drawing Sheets

(56) References Cited

OTHER PUBLICATIONS

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Wilmart, Q. et al., "A Versatile Silicon-Silicon Nitride Photonics Platform for Enhanced Functionalities and Applications," Applied Sciences, 9, 255. https://doi.org/10.3390/app9020255 (2019).

S. K. Selvaraja, and P. Sethi, "Review on Optical Waveguides", in Emerging Waveguide Technology. London, United Kingdom: IntechOpen, [Online]. Available: https://www.intechopen.com/chapters/61838 doi: 10.5772/intechopen.77150 (2018).

C. A. Barrios et al., "Demonstration of slot-waveguide structures on silicon nitride / silicon oxide platform," Optics Express 15, 6846-6856 (2007).

Pandey, Shesh Mani et al., "Multiple-Core Heterogeneous Waveguide Structures Including Multiple Slots" filed on Jan. 31, 2022 as a U.S. Appl. No. 17/588,440.

Sahin, Asli et al., "Photonics Integrated Circuit With Silicon Nitride Waveguide Edge Coupler" filed on Feb. 19, 2021 as a U.S. Appl. No. 17/179,532.

Dezfulian, Kevin K. et al., "Hybrid Edge Couplers With Layers in Multiple Levels" filed on Feb. 8, 2021 as a U.S. Appl. No. 17/169,971.

Bian, Yusheng et al., "Edge Couplers in the Back-End-Of-Line Stack of a Photonics Chip" filed on Jan. 19, 2021 as a U.S. Appl. No. 17/151,955.

Bian, Yusheng et al., "Metamaterial Edge Couplers in the Back-End-Of-Line Stack of a Photonics Chip" filed on Feb. 11, 2021 as a U.S. Appl. No. 17/173,639.

Pandey, Shesh Mani et al., "Optical Waveguide With Stacked Cladding Material Layers" filed on Feb. 18, 2022 as a U.S. Appl. No. 17/674,905.

* cited by examiner

WAVEGUIDES AND EDGE COUPLERS WITH
MULTIPLE-THICKNESS WAVEGUIDE
CORES

BACKGROUND

The disclosure relates to photonics chips and, more specifically, to photonics structures for a waveguide or an edge coupler and methods of fabricating a photonics structure for a waveguide or an edge coupler.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An edge coupler, also known as a spot-size converter, is an optical component that is commonly used for coupling light of a given mode from a light source, such as a laser or an optical fiber, to other optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected to another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Improved photonics structures for a waveguide or an edge coupler and methods of fabricating a photonics structure for a waveguide or an edge coupler are needed.

SUMMARY

In an embodiment of the invention, a photonics structure comprises a waveguide core including a first section, a second section longitudinally adjacent to the first section, a first plurality of segments projecting in a vertical direction from the first section, and a second plurality of segments projecting in the vertical direction from the second section. The first section of the waveguide core has a first thickness, and the second section of the waveguide core has a second thickness that is greater than the first thickness.

In an embodiment of the invention, a method forming a photonics structure is provided. The method comprises forming a waveguide core including a first section, a second section longitudinally adjacent to the first section, a first plurality of segments projecting in a vertical direction from the first section, and a second plurality of segments projecting in the vertical direction from the second section. The first section of the waveguide core has a first thickness, and the second section of the waveguide core has a second thickness that is greater than the first thickness.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
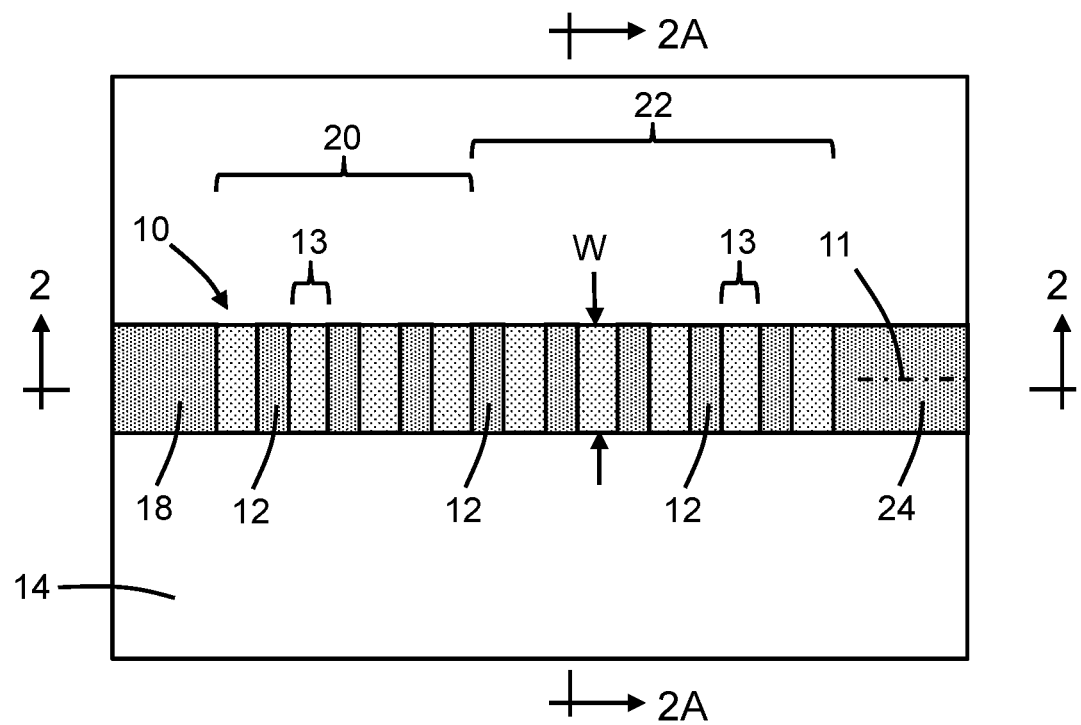
FIG. 1 is a top view of a waveguide core at an initial fabrication stage of a processing method in accordance with embodiments of the invention.
Figure 2:
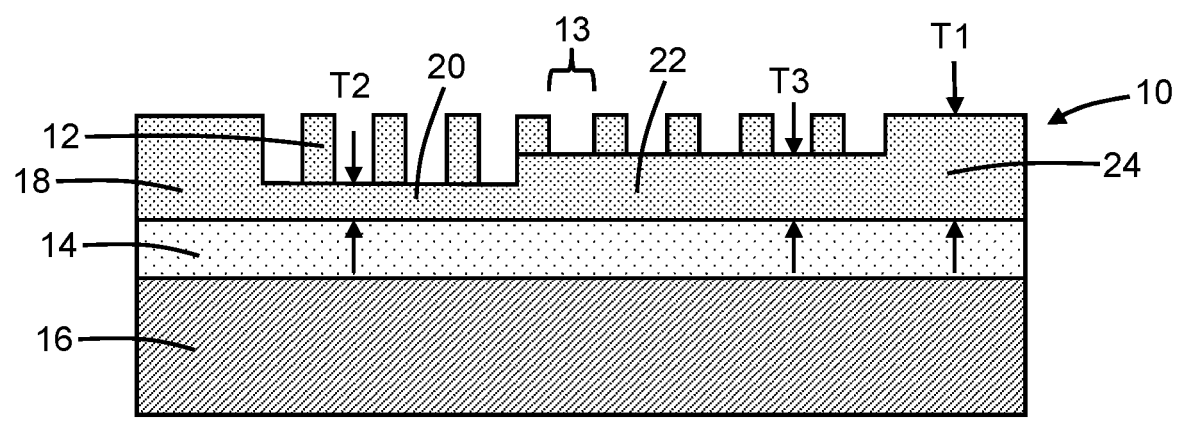
FIG. 2 is a cross-sectional view taken generally along line 2-2 in FIG. 1.
Figure 2A:
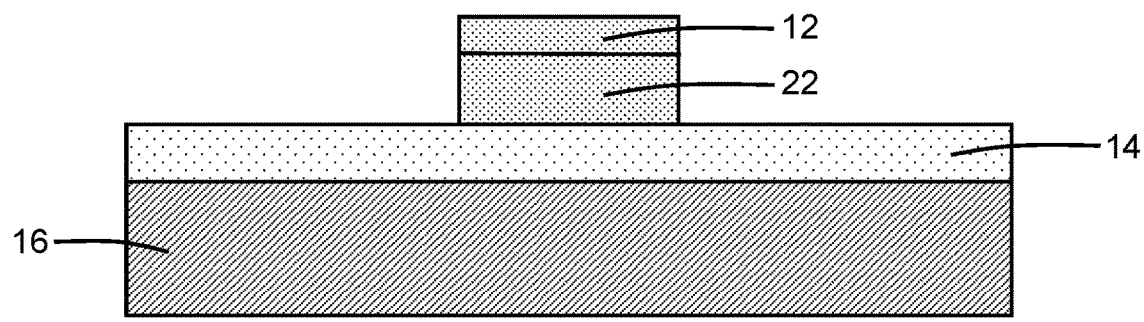
FIG. 2A is a cross-sectional view taken generally along line 2A-2A in FIG. 1.

With reference to FIGS. 1, 2, 2A and in accordance with embodiments of the invention, a waveguide core 10 includes a section 18, a section 24, a section 20 longitudinally adjacent to the section 18, a section 22 longitudinally adjacent to the section 24, and segments 12 that project in a vertical direction from the section 20 and the section 22. The waveguide core 10 may be aligned along a longitudinal axis 11, and the sections 20, 22 are positioned along the longitudinal axis 11 between the section 18 and the section 24. Adjacent pairs of the segments 12 are separated by gaps 13 defined by trenches that may extend across the full width of the waveguide core 10 in a lateral direction transverse to the longitudinal axis 11 and partially through the waveguide core 10 in a vertical direction. The depth of the trenches defining the segments 12 in section 20 differs from the depth of the trenches defining the segments 12 in section 22. In an embodiment, the depth of the trenches defining the segments 12 in section 20 is greater than the depth of the trenches defining the segments 12 in section 22.

The waveguide core 10 may be positioned in a vertical direction over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 10 from the substrate 16. In an alternative embodiment, an additional dielectric layer comprised of, for example, silicon dioxide may separate the waveguide core 10 from the dielectric layer 14.

The waveguide core 10 may be comprised of a dielectric material, such as silicon nitride, having a refractive index that is greater than the refractive index of silicon dioxide. In an alternative embodiment, the waveguide core 10 may be comprised of silicon oxynitride. In alternative embodiments, other materials, such as a polymer or a III-V compound semiconductor, may be used to form the waveguide core 10.

The waveguide core 10 has a width W that may be constant in the different sections 18, 20, 22, 24. The section 18 and the section 24 of the waveguide core 10 may have a thickness T1, the section 20 of the waveguide core 10 may have a thickness T2, and the section 22 of the waveguide core 10 may have a thickness T3. In an embodiment, the thickness T2 of the section 20 of the waveguide core 10 may be constant or substantially constant over its length. In an embodiment, the thickness T3 of the section 22 of the waveguide core 10 may be constant or substantially constant over its length. In an embodiment, the thickness T3 may be greater than the thickness T2. In an embodiment, the thickness T2 and the thickness T3 may each be less than the thickness T1. In an embodiment, the thickness T1 may be about 800 nanometers, and the thicknesses T2 and T3 may be less than 800 nanometers.

The waveguide core 10 may include one or more additional sections (not shown) like sections 20, 22 having a thickness that is less than the thickness T1 and from which segments 12 project in a vertical direction. For example, the waveguide core 10 may have an additional section with projecting segments 12 and a thickness that is greater than the thickness T2 and less than the thickness T3, and the additional section may be longitudinally positioned between section 20 and section 22.

The height of the segments 12 projecting from the section 20 of the waveguide core 10 may be equal to the difference between the thickness T1 and the thickness T2. The height of the segments 12 projecting from the section 22 of the waveguide core 10 may be equal to the difference between the thickness T1 and the thickness T3. In an embodiment, the height of the segments 12 projecting from the section 20 of the waveguide core 10 may be greater than the height of the segments 12 projecting from the section 22 of the waveguide core 10.

In an embodiment, each segment 12 may have a square or rectangular cross-section in a direction parallel to the longitudinal axis 11 and in a direction transverse to the longitudinal axis 11. In an embodiment, the pitch and duty cycle of the segments 12 may be uniform to define a periodic arrangement. In alternative embodiments, the pitch and/or the duty cycle of the segments 12 may be apodized (i.e., non-uniform) to define a non-periodic arrangement. The segments 12 may be dimensioned and positioned at small enough pitch so as to define a sub-wavelength grating-like structure that does not radiate or reflect light at a wavelength of operation, such as a wavelength in a range of 1260 nanometers to 1360 nanometers (the O-band).

In an embodiment, the waveguide core 10 may be formed by depositing a layer of its constituent dielectric material, and subsequently patterning the dielectric material with lithography and etching processes. In an embodiment, multiple sets of lithography and etching processes may be used with different etch masks to pattern the waveguide core 10 forming the varying-depth trenches defining the gaps 13 and to provide the sections 20, 22 with the multiple thicknesses of dielectric material.

Figure 3:
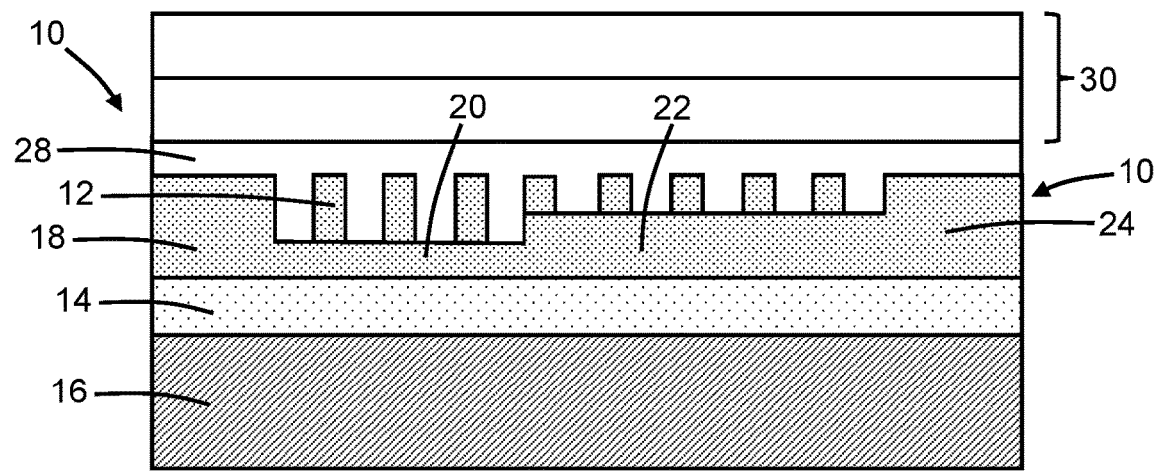
FIGS. 3, 3A are cross-sectional views of the waveguide core at a fabrication stage of the processing method subsequent to FIGS. 2, 2A.
Figure 3A:
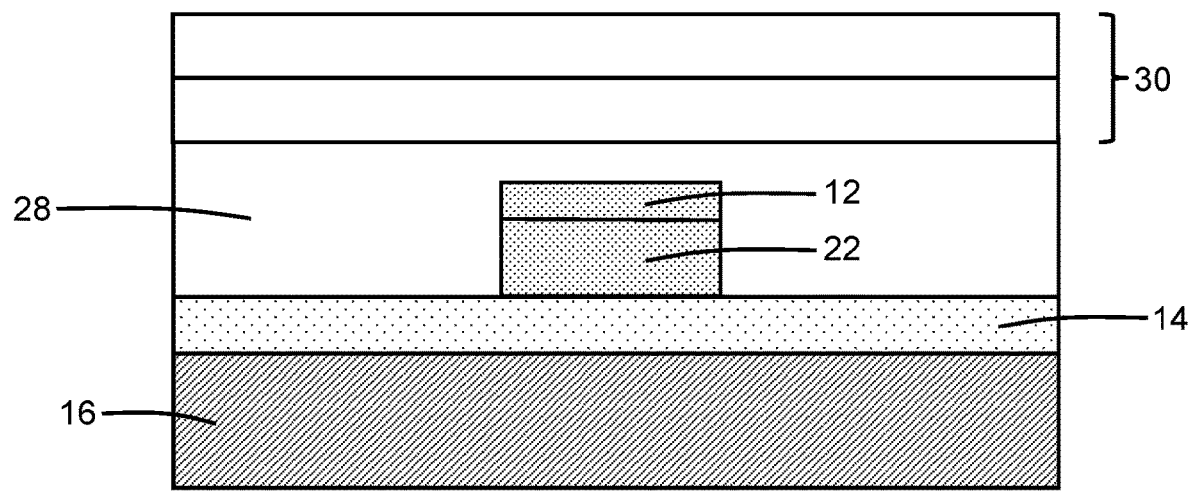

With reference to FIGS. 3, 3A in which like reference numerals refer to like features in FIGS. 2, 2A and at a subsequent fabrication stage, a dielectric layer 28 is formed over the segments 12. The dielectric layer 28 may be comprised of a dielectric material, such as silicon dioxide, that is deposited and then planarized following deposition. In the representative embodiment, the segments 12 are embedded in the dielectric layer 28. The thickness of the dielectric layer 28 and the heights of the segments 12 may be adjustable variables. The dielectric material constituting the dielectric layer 28 may have a refractive index that is less than the refractive index of the dielectric material constituting the waveguide core 10.

The dielectric material of the dielectric layer 28 is disposed in the gaps 13 between adjacent pairs of the segments 12 and over the different sections 20, 22. In an embodiment, the dielectric material of the dielectric layer 28 may fully fill the gaps 13. The segments 12 and the dielectric material of the dielectric layer 28 in the gaps 13 may define a metamaterial structure in which the dielectric material constituting the segments 12 has a higher refractive index than the dielectric material of the dielectric layer 28. The metamaterial structure including the segments 12 and the dielectric material of the dielectric layer 28 in the gaps 13 can be treated as a homogeneous material with an effective refractive index that is intermediate between the refractive index of the dielectric material constituting the segments 12 and the refractive index of the dielectric material constituting the dielectric layer 28.

A back-end-of-line stack 30 may be formed over the dielectric layer 28. The back-end-of-line stack 30 may include stacked dielectric layers that are each comprised of a dielectric material, such as silicon dioxide, silicon nitride, tetraethylorthosilicate silicon dioxide, or fluorinated-tetraethylorthosilicate silicon dioxide.

The waveguide core 10, in any of its embodiments described herein, may be deployed in a photonic integrated circuit or, alternatively, may be deployed in a photonics chip that includes electronic components and additional optical components. For example, the electronic components of a photonics chip may include field-effect transistors that are fabricated by CMOS processing. The waveguide core 10 may be used to guide propagating light or, alternatively, may be integrated into an optical component, such as an edge coupler, that also guides propagating light.

The segments 12 and the sections 20, 22 of the waveguide core 10 may provide the ability to control mode properties for improving system level performance, particularly for larger values (e.g., about 800 nanometers) of the thickness T1. For example, birefringence and differential group delay may be reduced such that the time/group delay between transverse electrode mode and transverse magnetic mode polarizations for light guided by the waveguide core 10 is diminished and propagating light of the different polarization modes travels at more similar speeds. As another example, the segments 12 and the sections 20, 22 of the waveguide core 10 may be tailored to modify the mode pattern and shape of the light guided by the waveguide core 10. The waveguide core 10 may be characterized by a more efficient mode conversion, particularly for larger values of the thickness T1. Fabrication requirements, such as line width for the segments 12, may be relaxed due to the modified design of the waveguide core 10 that adds the sections 20, 22 of different thickness.

Figure 4:
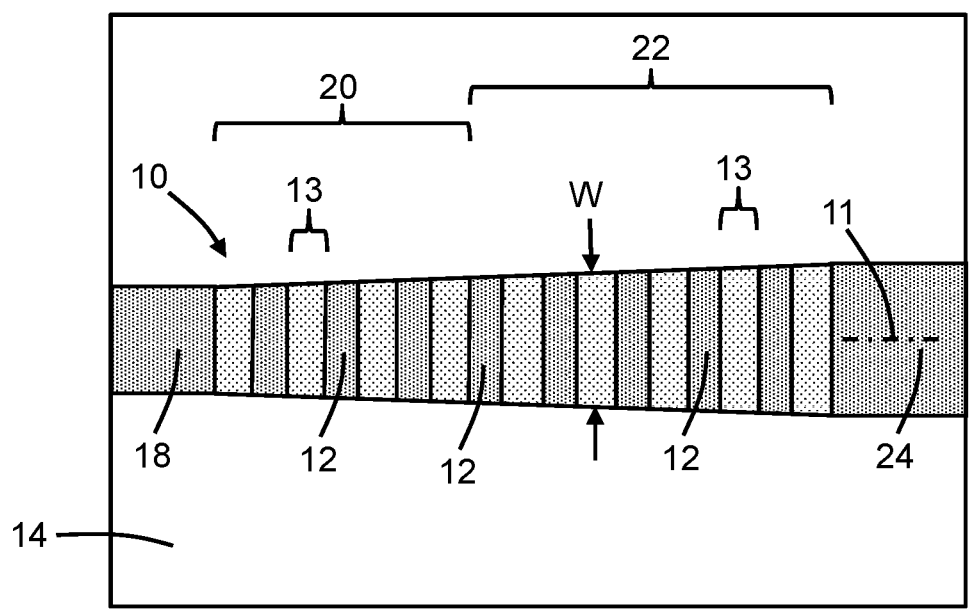
FIG. 4 is a top view of a waveguide core in accordance with embodiments of the invention.

With reference to FIG. 4 and in accordance with alternative embodiments of the invention, the segments 12 and the sections 20, 22 of the waveguide core 10 may be modified to have a tapered shape. In an embodiment, the segments 12 of different height and the sections 20, 22 of different thickness may be modified to define a tapered shape that is an inverse taper. An inverse taper refers to a tapered section of a waveguide core characterized by a gradual increase in width along a mode propagation direction. In that regard, the width W of the segments 12 and the sections 20, 22 may increase with decreasing distance along the longitudinal axis 11 from the section 24 of the waveguide core 10. In an embodiment, the width W may increase based on a linear function. In an alternative embodiment, the width W may increase based on a non-linear function, such as a quadratic function, a cubic function, a parabolic function, a sine function, a cosine function, a Bezier function, or an exponential function.

Figure 5:
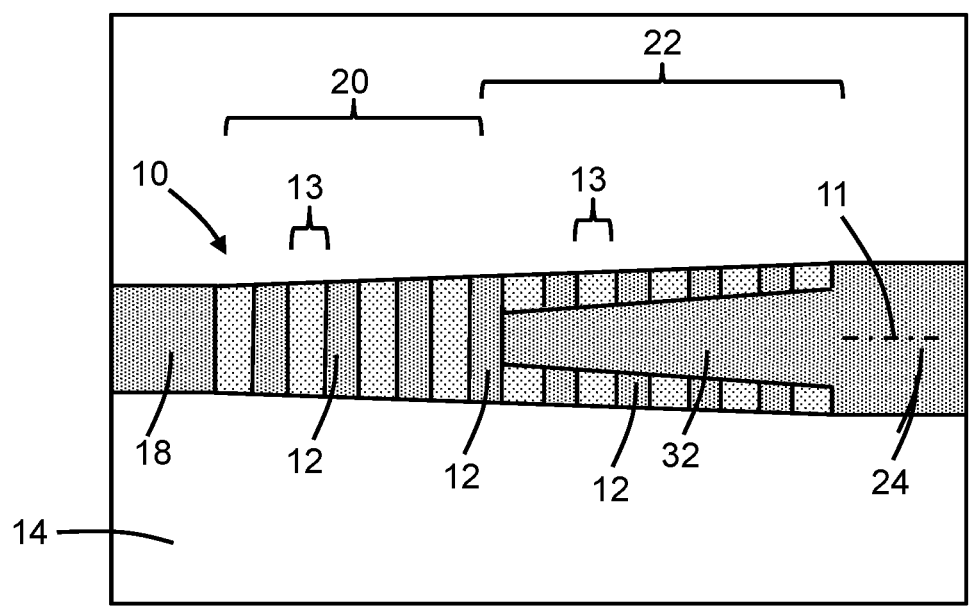
FIG. 5 is a top view of a waveguide core in accordance with embodiments of the invention.

With reference to FIG. 5 and in accordance with alternative embodiments of the invention, the waveguide core 10 may include a rib 32 that is overlaid with at least some of the segments 12. In an embodiment, the rib 32 may be tapered and may increase in width with decreasing distance from the section 24 of the waveguide core 10. In the representative embodiment, the rib 32 may be overlaid with only the section 22 and all of the segments 12 projecting from the section 22. In an alternative embodiment, the rib 32 may be overlaid with only a portion of the section 22 and some of the segments 12 projecting from the section 22. In an alternative embodiment, the rib 32 may be overlaid with both of the sections 20, 22 and at least some of the segments 12 projecting from both of the sections 20, 22.

In an embodiment, the rib 32 may have a thickness equal to the thickness T1 of the section 18 and the section 24 of the waveguide core 10. The rib 32 may adjoin the section 24, and the rib 32 may terminate coincident with one of the segments 12. The segments 12 that are overlaid by the rib 32 are divided and project laterally outward from the opposite sides of the rib 32.

Figure 6:
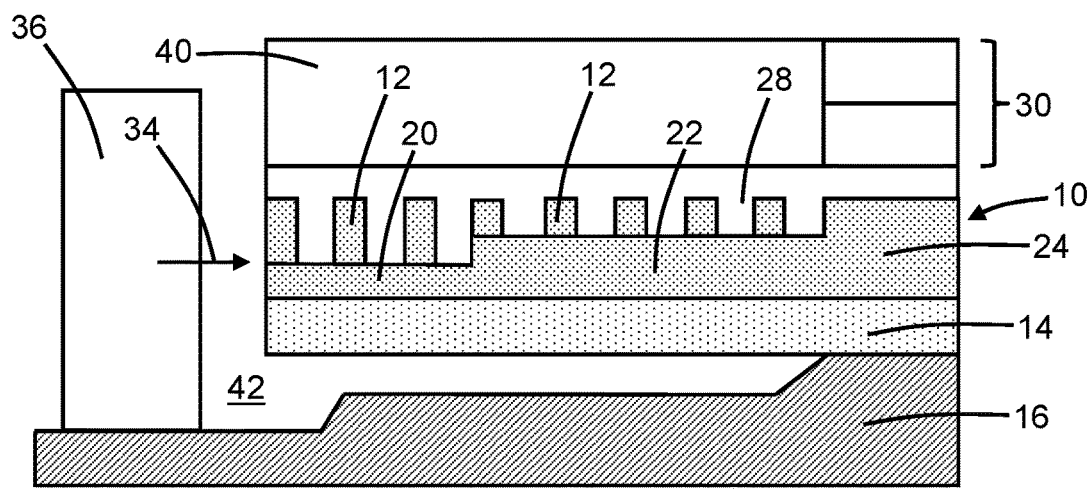
FIG. 6 is a cross-sectional view of an edge coupler including a waveguide core in accordance with embodiments of the invention.

With reference to FIG. 6 and in accordance with alternative embodiments of the invention, the waveguide core 10 may be incorporated into an optical component, such as an edge coupler in the representative embodiment. In that regard, one of the segments 12 may terminate the waveguide core 10, and the back-end-of-line stack 30 may be removed from above the sections 20, 22, 24 of the waveguide core 10 and replaced by a dielectric layer 40 comprised of a dielectric material, such as silicon dioxide. Light (e.g., laser light) may be provided in a mode propagation direction 34 from a light source 36 toward the waveguide core 10. The light may have a given wavelength, intensity, mode shape, and mode size, and the edge coupler providing the representative optical component may provide spot size conversion for the light.

Figure 7:
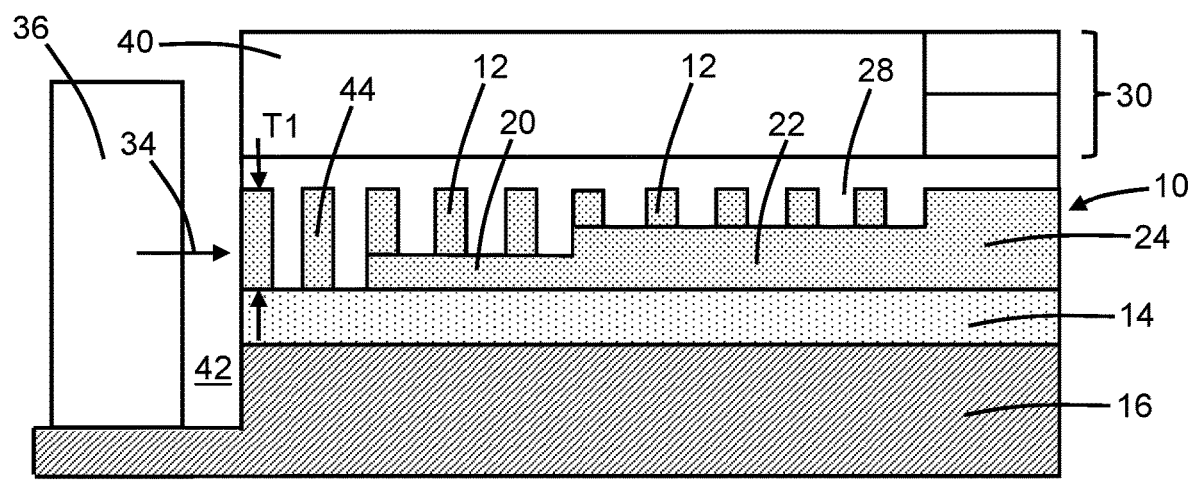
FIG. 7 is a cross-sectional view of an edge coupler including a waveguide core in accordance with embodiments of the invention.

In an embodiment, the light source 36 may be a single-mode optical fiber that is positioned adjacent to the edge coupler. The light source 36 may be positioned in a groove 42 patterned in the substrate 16, and the groove 42 may extend as an optional undercut beneath the edge coupler. Alternatively, the optional undercut may be omitted such that the substrate 16 is fully solid beneath the edge coupler, as shown in FIG. 7. In an alternative embodiment, the light source 36 may be a semiconductor laser positioned adjacent to the edge coupler, and the semiconductor laser may be attached inside a cavity patterned as a closed groove (i.e., trench) in the substrate 16.

In an alternative embodiment, the segments 12 and the sections 20, 22 may be tapered, as described in connection with FIG. 4, such that the width of the segments 12 and the sections 20, 22 increases with increasing distance from the light source 36. In an alternative embodiment, the segments 12 and the sections 20, 22 may be tapered, and the edge coupler may further include the rib 32 as described in connection with FIG. 5.

With reference to FIG. 7 and in accordance with alternative embodiments of the invention, the waveguide core 10 incorporated into the edge coupler may include segments 44 that are adjacent to the light source 36 and that are disconnected from the section 20. The segments 44 may be positioned longitudinally between the light source 36 and the segments 12 and sections 20, 22 of the waveguide core 10. In an embodiment, the segments 44 may have a height equal to the thickness T1.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A photonics structure comprising:
a waveguide core including a first section, a second section longitudinally adjacent to the first section, a first plurality of segments projecting in a vertical direction from the first section, and a second plurality of segments projecting in the vertical direction from the second section, the first section of the waveguide core having a first thickness, and the second section of the waveguide core having a second thickness that is greater than the first thickness,
wherein the first plurality of segments are separated by a plurality of gaps, a dielectric material is positioned in the plurality of gaps, the first plurality of segments comprise silicon nitride, and the dielectric material comprises silicon dioxide.

2. The photonics structure of claim 1 wherein the waveguide core further includes a third section adjoined to the second section, and the third section of the waveguide core has a third thickness that is greater than the second thickness.

3. The photonics structure of claim 2 wherein the first plurality of segments have a height relative to the first section of the waveguide core equal to a difference between the first thickness and the third thickness.

4. The photonics structure of claim 2 wherein the second plurality of segments have a height relative to the second section of the waveguide core equal to a difference between the second thickness and the third thickness.

5. A photonics structure comprising:
a waveguide core including a first section, a second section longitudinally adjacent to the first section, a first plurality of segments projecting in a vertical direction from the first section, and a second plurality of segments projecting in the vertical direction from the second section, the first section of the waveguide core having a first thickness, and the second section of the waveguide core having a second thickness that is greater than the first thickness; and
a light source positioned adjacent to the first section of the waveguide core, the light source configured to provide light in a mode propagation direction to the waveguide core.

6. The photonics structure of claim 5 wherein the waveguide core is terminated by the first section.

7. The photonics structure of claim 5 wherein the light source is a semiconductor laser.

8. The photonics structure of claim 5 wherein the light source is an optical fiber.

9. The photonics structure of claim 5 wherein the first plurality of segments have a first height relative to the first section of the waveguide core, the second plurality of segments have a second height relative to the second section of the waveguide core, and the first height is greater than the second height.

10. The photonics structure of claim 5 wherein the waveguide core includes a third plurality of segments positioned between the first section and the light source, and the third plurality of segments are disconnected from the first section.

11. The photonics structure of claim 5 wherein the first section, the second section, the first plurality of segments, and the second plurality of segments increase in width with increasing distance from the light source.

12. The photonics structure of claim 5 further comprising:
a substrate,
wherein the waveguide core is positioned on the substrate, the substrate includes a groove having an undercut that extends beneath at least a portion of the waveguide core, and the light source is positioned in the groove.

13. The photonics structure of claim 1 wherein the waveguide core further includes a rib overlaid with the second section of the waveguide core and at least some of the second plurality of segments.

14. The photonics structure of claim 1 wherein the waveguide core comprises silicon nitride, and the waveguide core has a thickness of about 800 nanometers.

15. The photonics structure of claim 1 wherein the first plurality of segments, the second plurality of segments, and the dielectric material define a metamaterial structure.

16. A method of forming a photonics structure, the method comprising:
forming a waveguide core including a first section, a second section longitudinally adjacent to the first section, a first plurality of segments projecting in a vertical direction from the first section, and a second plurality of segments projecting in the vertical direction from the second section,
wherein the first section of the waveguide core has a first thickness, the second section of the waveguide core has a second thickness that is greater than the first thickness, the waveguide core comprises silicon nitride, and the waveguide core has a thickness of about 800 nanometers.

17. The method of claim 16 wherein the waveguide core further includes a third section adjoined to the second section, and the third section of the waveguide core has a third thickness that is greater than the second thickness.

18. The method of claim 17 wherein the first plurality of segments have a first height relative to the first section of the waveguide core equal to a difference between the first thickness and the third thickness, and the second plurality of segments have a second height relative to the second section of the waveguide core equal to a difference between the second thickness and the third thickness.

19. The method of claim 16 further comprising:
positioning a light source adjacent to the first section of the waveguide core, the light source configured to provide light in a mode propagation direction toward the waveguide core.

20. The structure of claim 1 further comprising:
a light source positioned adjacent to the first section of the waveguide core, the light source configured to provide light in a mode propagation direction to the waveguide core.

* * * * *